July 13, 1954 J. H. STAAK 2,683,826
DYNAMOELECTRIC MACHINE STATOR CONSTRUCTION
Filed March 3, 1953
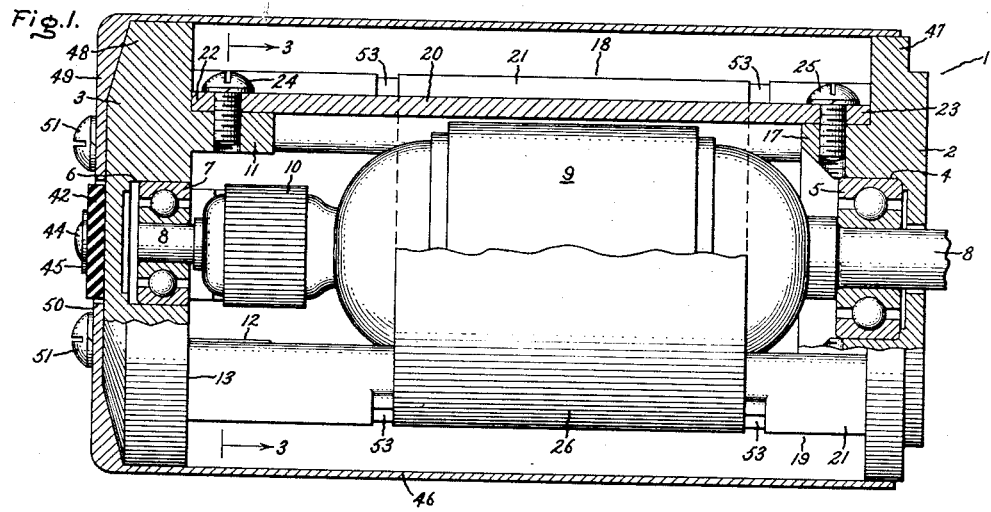
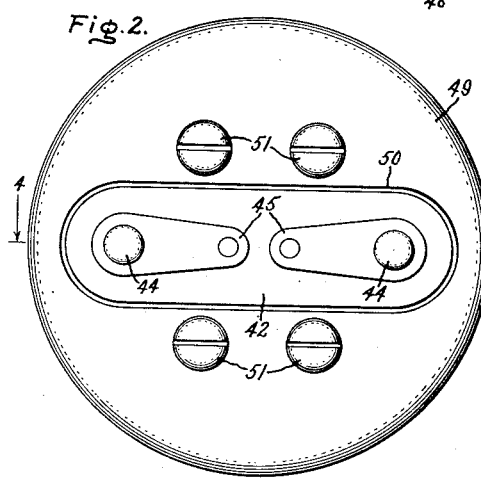
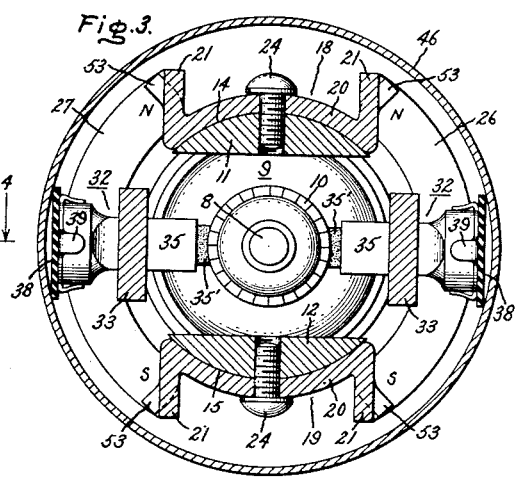
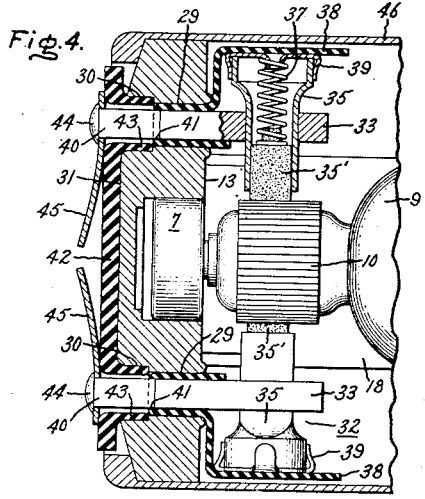
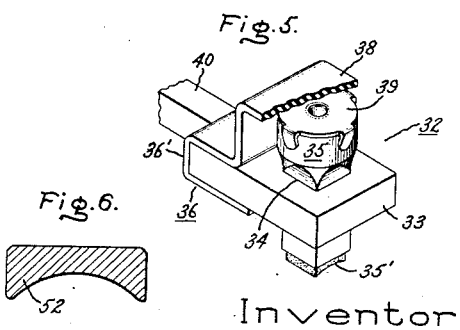
Inventor:
Julius H. Staak,
by *Robert G. Ivins*
His Attorney.

Patented July 13, 1954

2,683,826

UNITED STATES PATENT OFFICE 2,683,826

DYNAMOELECTRIC MACHINE STATOR CONSTRUCTION

Julius H. Staak, Fort Wayne, Ind., assignor to General Electric Company, a corporation of New York Application March 3, 1953, Serial No. 339,991

10 Claims. (Cl. 310—154)

This invention relates to stator constructions for dynamo-electric machines and more particularly to a stator construction for a small permanent magnet-excited type of machine.

In the design of certain small permanent magnet-excited dynamo-electric machines, for example, computer motors used in aircraft applications, it is desirable that the length of the air gap between the rotor and stator and the concentricity of the rotor within the stator be accurately maintained. In the past, these machines have been constructed with many small component parts and the requirement for maintenance of the air gap and concentricity have necessitated expensive manufacturing and assembly operations. It is therefore desirable to provide a dynamo-electric machine stator construction, particularly suited for small permanent magnet-excited machines, wherein the air gap length and concentricity requirements are met with a minimum of machining and assembly operations. It is further desirable that such a dynamoelectric machine stator construction provide simple and easy alignment of the two end flanges and the rotor.

It is therefore an object of this invention to provide an improved dynamo-electric machine stator construction incorporating the desirable features set forth above.

Another object of this invention is to provide an improved brush holder assembly for small dynamoelectric machines.

Further objects and advantages of this invention will become apparent and the invention will be better understood by reference to the following description and the accompanying drawing, and the features of novelty which characterize this invention will be pointed out with particularty in the claims annexed to and forming a part of this specification.

In accordance with the preferred embodiment of this invention, a pair of spaced apart end shield members are provided with a plurality of elongated and longitudinally disposed pole piece members having their ends respectively secured to the end shield members thereby bridging the same and defining a bore for the rotor of the machine. These pole piece members may have a substantially U-shaped cross-section with their webs being curved transversely conforming to the bore of the machine and with their flanges extending outwardly. A plurality of permanent magnet members are provided having their ends respectively engaging the pole piece members intermediate their ends. These permanent magnets may also be curved to conform to the bore with their ends respectively engaging the flanges of the pole piece members.

In a modified form of this invention, the pole piece members do not have a U-shaped cross section, but rather a solid section produced in any suitable manner as by extruding.

A brush holder assembly may be secured to one of the end shield members with its brush holder tube being disposed between the pole piece members. More specifically, the one end shield member may have a first enlarged opening formed in its inner side and a smaller opening formed in its outer side communicating with the enlarged opening. A brush holder mounting member formed of conducting material is provided having a first portion seated in the enlarged opening and extending outwardly therefrom with an opening formed therein which a brush holder tube is positioned. The brush holder mounting member has a second portion extending into the smaller end shield opening and insulating means are provided insulating the brush holder mounting member from the end shield. A terminal is secured to the brush holder mounting member second portion on the exterior side of the end shield member for making electrical connections to the machine.

In the drawing,

Fig. 1 is a side elevational view, partly in section, illustrating the improved dynamo-electric machine stator construction of this invention;

Fig. 2 is an end view of the machine of Fig. 1;

Fig. 3 is a cross-sectional view taken along the line 3—3 of Fig. 1;

Fig. 4 is a fragmentary cross-sectional view taken along the line 4—4 of Fig. 2;

Fig. 5 is a fragmentary view in perspective further illustrating the improved brush holder assembly of this invention; and Fig. 6 shows an alternative pole piece member cross section.

Referring now to the drawing, there is shown a permanent magnet-excited dynamo-electric machine, generally identified as 1, such as a small direct current computer motor, having a pair of spaced-apart end shield members 2 and 3. End shield member 2 has a cavity 4 machined in its inner surface in which a suitable anti-friction bearing 5 is positioned while end shield member 3 has a similar cavity 6 machined in its inner surface with anti-friction bearing 7 being arranged therein. Bearings 5 and 7 rotatably support shaft 8 on which armature member 9 and commutator 10 are mounted.

In order to provide the field structure for the machine, end shield member 3 is provided with a pair of bosses 11 and 12 extending outwardly from its inner surface 13, these bosses having their outer surfaces 14 and 15 machined on the same center as bearing cavity 6 to conform to the desired bore for the armature 9. End shield member 2 has an annular flange 17 formed on its inner surface similarly machined on its outer surface on the same center as bearing cavity 4 to conform to the bore for the armature 9. A pair of elongated longitudinally and oppositely disposed pole piece members 18 and 19 are provided, preferably having a substantially U-shaped cross-section with their webs 20 being curved transversely to conform to the desired bore for the armature 9 and with their flanges 21 respectively extending outwardly. The ends 22 and 23 of web portions 20 of pole piece members 18 and 19 respectively engage the outer surfaces of bosses 11 and 12 of end shield member 3 and annular flange 17 of end shield member 2, being secured thereto respectively by screws 24 and 25. It will now be seen that the pole piece members 18 and 19, which may be formed from any suitable magnetic material and which may be either stamped or formed from solid extruded bar stock, bridge the pole piece members 2 and 3 and define the bore for the armature 9.

In order to excite the pole piece members 18 and 19, a pair of permanent magnets 26 and 27 are provided, polarized as shown in Fig. 3, with their ends engaging flanges 21 of pole piece members 18 and 19 intermediate the ends 22 and 23 thereof. Permanent magnets 26 and 27 are also curved to conform to the bore of the rotor 9. It will be readily apparent that if previously polarized, permanent magnets 26 and 27 will hold themselves in tight engagement with flanges 21 of pole piece members 18 and 19 and that no further securing means will be necessary. The preferable method is to hold magnets 26 and 27 to pole piece members 18 temporarily in any suitable manner, as by an adhesive form of tape and to magnetize them in their assembled position. Ears 53 may be formed in flanges 21 to locate the magnets axially.

It will not be readily seen that the construction thus far described provides a construction wherein the air gap length and concentricity are automatically maintained since the pole piece members 18 and 19 which define the bore and thus the air gap are mounted on bosses 11 and 12 of end shield 3 and annular flange 17 of end shield 2 which have been respectively machined on the same centers as the bearing cavities 6 and 4 respectively.

In order to provide a brush holder assembly for machine 1, a pair of enlarged rectangular oppositely disposed openings 29 are formed in the inner face 13 of end shield 3 while a pair of smaller circular openings 30 are formed in the outer face 31 and respectively communicating with the openings 29. Brush holder mounting members 32 formed of suitable conducting material are provided each having an enlarged portion 33 seated in one of the openings 29 and extending outwardly into the interior of the machine. Portions 33 of brush holder mounting members 32 have openings 34 formed therein in which brush holder tubes 35 are respectively positioned. Brush holder tubes 35 accommodate brushes 35' which are biased into contact with commutator 10 by springs 37. In order to respectively insulate portions 33 of brush holder mounting members 32 from end shield member 3, insulating members 36 are provided formed of suitable sheet insulating material. Each of the insulators 36 has a first portion 36' embracing the end of portion 33 of a brush holder mounting member 32 seated in opening 29 of end shield 3 and a second portion 38 extending into the interior of the machine and engaging cap 39 on top of a brush holder 35. Each brush holder mounting member 32 has a smaller rectangular extension portion 40 extending through an opening 41 in inner portion 36' of an insulator 36 and through one of the smaller openings 30 to the exterior of end shield 3. Another insulator 42 is provided having portions 43 extending into openings 30 thereby insulating extension portions 40 of brush holder members 32 from end shield 3. Extensions 40 of brush holder mounting members 32 extend beyond the exterior surface of insulator 42 and have rivet heads 44 formed thereon engaging terminals 45. The terminals 45 provide for making external electrical connections to the brushes 36. It will be readily seen by reference to Fig. 3 that the brush holder assemblies are positioned intermediate the pole piece members 18 and 19.

In order to enclose the machine thus far described, a cylindrical drawn case 46 is provided mounted on outer cylindrical portions 47 and 48 of end shield members 2 and 3 respectively. Case 46 has an end portion 49 engaging the outer surface of end shield member 3 and having an opening 50 formed therein exposing insulator 42 and terminals 45. Case 46 is held in assembled relation by any suitable means, such as screws 51.

Referring now to Fig. 6, it is seen that the pole piece members may have a solid connection, as at 52, produced in any suitable manner, as by extruding.

It will now be readily apparent that this invention provides an improved dynamo-electric machine stator construction characterized by its simplicity, the minimum number of machining and assembly operations, and assured air gap length and concentricity.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. In a dynamo-electric machine, a stator assembly comprising a pair of spaced apart end shield members, each of said end shield members having formed thereon an inwardly extending part, a plurality of elongated longitudinally disposed pole piece members, each of said pole piece members having an end overlying and radially secured to said inwardly extending part on each of said end shield members thereby bridging the same and defining a bore for the rotor of said machine, and a plurality of permanent magnet members having their ends respectively engaging said pole piece members intermediate the ends thereof.

2. In a dynamo-electric machine, a stator assembly comprising a pair of spaced apart end shield members, each of said end shield members having formed thereon an inwardly extending part, a pair of elongated longitudinally disposed pole piece members, each of said pole piece members having an end overlying and radially secured to said inwardly extending part on each of said end shield members thereby bridging the same and defining a bore for the rotor of said machine, said pole piece members being curved transversely to conform to said bore, and a plurality of permanent magnet members having their ends respectively engaging said pole piece members intermediate the ends thereof, said permanent magnet members being curved to conform to said bore.

3. In a dynamo-electric machine, a stator assembly comprising a pair of spaced apart end shield members, each of said end shield members having formed thereon an inwardly extending part, a plurality of elongated longitudinally disposed pole piece members, each of said pole piece members having an end overlying and radially secured to said inwardly extending part on each of said end shield members thereby bridging the same and defining a bore for the rotor of said machine, each of said pole piece members having a substantially U-shaped cross-section with its web being curved transversely to conform to said bore and its flanges extending outwardly, and a plurality of permanent magnet members having their ends respectively engaging said pole piece member flanges intermediate the ends thereof, said permanent magnet members being curved to conform to said bore.

4. In a dynamo-electric machine having a rotor, a stator assembly comprising a pair of spaced apart end shield members, each of said end shield members having formed thereon an inwardly extending part, each of said parts having an outer surface formed concentrically with the axis of rotation of said rotor, a plurality of elongated longitudinally disposed pole piece members, each of said pole piece members having an end overlying and radially secured to the outer surface of said inwardly extending part on each of said end shield members thereby bridging the same and defining a bore for the rotor of said machine, a plurality of permanent magnet members having their ends respectively engaging said pole piece members intermediate the ends thereof, and brush rigging disposed between said pole piece members.

5. In a dynamo-electric machine having a rotor, a stator assembly comprising a pair of spaced apart end shield members, each of said end shield members having formed thereon an inwardly extending part, each of said parts having an outer surface formed concentrically with the axis of rotation of said rotor, a plurality of elongated longitudinally disposed pole piece members, each of said pole pieces having an end overlying and radially secured to the outer surface of said inwardly extending part on each of said end shield members thereby bridging the same and defining a bore for the rotor of said machine, a plurality of permanent magnet members having their ends respectively engaging said pole piece members intermediate the ends thereof, and brush rigging secured to one of said end shield members.

6. In a dynamo-electric machine, a stator assembly comprising a pair of spaced apart end shield members, a plurality of elongated longitudinally disposed pole piece members having their ends respectively secured to said end shield members thereby bridging the same and defining a bore for the rotor of said machine, a plurality of permanent magnet members having their ends respectively engaging said pole piece members intermediate the ends thereof, one of said end shield members having an enlarged opening formed in its inner side and a smaller opening formed in its outer side communicating with said enlarged opening, a brush holder mounting member formed of conductive material having a first portion seated in said enlarged opening and extending outwardly therefrom with an opening formed therein, a brush holder tube positioned in said brush holder mounting member opening, said brush holder mounting member having a second noncircular portion extending into said smaller end shield opening, means insulating said first brush holder mounting member portion from said one end shield member, means insulating said second brush holder mounting member portion from said one end shield member, and a terminal secured to said brush holder mounting member second portion on the exterior of said second insulating member and said one end shield member.

7. In a dynamo-electric machine, a stator assembly comprising a pair of spaced apart end shield members, a plurality of elongated longitudinally disposed pole piece members having their ends respectively secured to said end shield members thereby bridging the same and defining a bore for the rotor of said machine, a plurality of permanent magnet members having their ends respectively engaging said pole piece members intermediate the ends thereof, one of said end shield members having an enlarged opening formed in its inner side and a smaller opening formed in its other side and communicating with said enlarged opening, a brush holder mounting member formed of conductive material having a first noncircular portion seated in said enlarged end shield opening and extending outwardly therefrom with an opening formed therein, a brush holder tube positioned in said brush holder mounting member opening and disposed between said pole piece members, said brush holder mounting member having a second noncircular portion extending into said smaller end shield opening, a first insulating member having a first portion seated in said enlarged end shield opening embracing said brush holder mounting member first portion insulating the same from said one end shield member and having an opening formed therein accommodating said brush holder mounting member second portion, said first insulating member having an extension portion engaging the top of said brush holder tube, a second insulating member having a first portion engaging said outer side of said end shield member and a second portion entering said smaller end shield member opening surrounding said brush holder mounting member second portion insulating the same from said one end shield member, and a terminal secured to said brush holder mounting member second portion on the exterior of said second insulating member.

8. In a dynamo-electric machine, a stator assembly comprising a pair of spaced apart end shield members, a plurality of elongated longitudinally disposed pole piece members having their ends respectively secured to said end shield members thereby bridging the same and defining a bore for the rotor of said machine, each of said pole piece members having a substantially U-shaped cross-section with its web being curved transversely to conform to said bore and its flanges extending outwardly, a plurality of permanent magnet members having their ends respectively engaging said pole piece member flanges intermediate the ends thereof, said permanent magnet members being curved to conform to said bore, one of said end shield members having an enlarged rectangular opening formed in its inner side and a smaller rectangular opening formed in its outer side communicating with said enlarged opening, a brush holder mounting member formed of conductive material having a first portion seated in said enlarged end shield opening and extending outwardly therefrom with an opening formed therein, a brush holder tube positioned in said brush holder mounting member opening and disposed between said pole piece members, said brush holder mounting member having a second portion extending into said smaller end shield opening, a first insulating member having a first portion seated in said enlarged end shield member opening embracing said brush holder mounting member first portion insulating the same from said one end shield member and having an opening formed therein accommodating said brush holder mounting member second portion, said first insulating member having an extension portion engaging the top of said brush holder tube, a second insulating member having a first portion engaging said outer side of said end shield member and a second portion entering said smaller end shield member opening surrounding said brush holder mounting member second portion insulating the same from said one end shield member, said second portion of said brush holder mounting member having a rivet head formed on the exterior of said second insulating member securing a terminal thereto, and a cover member for said machine engaging said end shield and having an end portion engaging said outer side of said one end shield member, said cover member end portion having an opening formed therein exposing said terminal.

9. In a dynamo-electric machine, an end shield member having an enlarged noncircular opening formed in one side thereof and a smaller noncircular opening formed in its other side and communicating with said enlarged opening, a brush holder mounting member formed of conductive material having a first portion seated in said enlarged end shield opening and extending outwardly therefrom with an opening formed therein, a brush holder tube positioned in said brush holder mounting member opening, said brush holder mounting member having a second portion extending into said smaller end shield opening, means insulating said first brush holder mounting member portion from said end shield member, means insulating said second brush holder mounting portion from said end shield member, and a terminal secured to said brush holder mounting member second portion on the exterior of said second insulating member.

10. In a dynamo-electric machine, an end shield member having an enlarged rectangular opening formed in one side thereof and a smaller rectangular opening formed in its other side and communicating with said enlarged opening, a brush holder mounting member formed of conductive material having a first rectangular portion seated in said enlarged end shield opening and extending outwardly therefrom with an opening formed therein, a brush holder tube positioned in said brush holder mounting member opening, a first insulating member having a first portion seated in said enlarged end shield member opening embracing said brush holder mounting member first portion insulating the same from end shield member and having an opening formed therein accommodating said brush holder mounting member second portion, said first insulating member having an extension portion engaging the top of said brush holder tube, a second insulating member having a first portion engaging said other side of said end shield member and a second rectangular portion extending into said smaller end shield member opening surrounding said brush holder mounting member second portion insulating the same from said end shield member, and a terminal secured to said brush holder mounting member second portion on the exterior of said second insulating member.

References Cited in the file of this patent

UNITED STATES PATENTS

| Number | Name | Date |
| --- | --- | --- |
| 459,222 | Lehmann | Sept. 3, 1891 |
| 1,098,753 | Podlesak | June 2, 1914 |
| 1,422,154 | Watson | July 11, 1922 |
| 2,412,850 | Whitted | Dec. 17, 1946 |
| 2,426,815 | Burrus | Sept. 2, 1947 |
| 2,513,226 | Wylie | June 27, 1950 |